(12) United States Patent
Dawson et al.

(10) Patent No.: US 7,956,297 B2
(45) Date of Patent: Jun. 7, 2011

(54) WATER RESISTANT QUICK STOP SCALE DAMPER

(75) Inventors: Michael P. Dawson, Huntersville, NC (US); Mark A. Stultz, Huntersville, NC (US); Joseph Ramos, Inman, SC (US)

(73) Assignee: Rubbermaid Incorporated, Huntersville, NC (US)

( * ) Notice: Subject to any disclaimer, the term of this patent is extended or adjusted under 35 U.S.C. 154(b) by 275 days.

(21) Appl. No.: 12/243,526

(22) Filed: Oct. 1, 2008

(65) Prior Publication Data

US 2010/0078229 A1    Apr. 1, 2010

(51) Int. Cl.
*G01G 21/10* (2006.01)
(52) U.S. Cl. ............ 177/184; 177/187; 177/189; 16/66; 4/248; 267/120
(58) Field of Classification Search .................. 177/184, 177/186–189; 188/300; 267/64.11, 64.12, 267/120; 16/66–70; 4/248
See application file for complete search history.

(56) References Cited

U.S. PATENT DOCUMENTS

| | | | | |
|---|---|---|---|---|
| 765,643 | A * | 7/1904 | Tregoning | ........................ 4/246.4 |
| 1,457,328 | A | 6/1923 | Van Berkel | |
| 1,837,817 | A | 12/1931 | Hallead | |
| 2,666,944 | A * | 1/1954 | Stehlin | .............................. 16/70 |
| 3,995,842 | A * | 12/1976 | Freitag | ........................... 188/376 |
| 4,285,412 | A | 8/1981 | Wirth | |
| 4,440,250 | A | 4/1984 | Sigg | |
| 4,483,044 | A * | 11/1984 | Johnston et al. | ................... 16/70 |
| 4,526,246 | A | 7/1985 | Patoray | |
| 4,848,495 | A | 7/1989 | Hayashi | |
| 6,359,239 | B1 | 3/2002 | Missler et al. | |
| 6,442,796 | B2 * | 9/2002 | Arisaka et al. | ..................... 16/84 |
| 7,057,119 | B2 | 6/2006 | Larsen et al. | |
| 7,367,086 | B2 * | 5/2008 | Ito | ..................................... 16/85 |
| 7,829,801 | B2 * | 11/2010 | Nizzere et al. | ................. 177/184 |
| 2009/0139776 | A1 * | 6/2009 | Nizzere et al. | ................. 177/187 |
| 2010/0162522 | A1 * | 7/2010 | Han et al. | .......................... 16/67 |

* cited by examiner

*Primary Examiner* — Randy W Gibson
(74) *Attorney, Agent, or Firm* — Lempia Summerfield Katz LLC

(57) ABSTRACT

A water resistant scale damper has a damper sleeve with an interior passage, an open top, and an open bottom. A piston is received in and axially slidable along the interior passage and has a top surface, an underside, and a piston rod extending from the underside toward the open bottom. A top cap is fitted over the open top of the sleeve and an air chamber is created between the top cap and the top surface of the piston. An air passage is formed through the top cap to permit air to enter and exit the air chamber. A portion of the top cap can create an elongate, non-linear air channel between the air passage and a port remote from the air passage and formed through the top cap. A bottom cap can also be fitted over the open bottom of the sleeve. The bottom cap has an annular flange that extends radially inward from a skirt of the bottom cap. The flange is funnel-shaped so as to direct liquid from beneath the underside of the piston toward a central opening in the flange. The piston rod extends through the central opening in the flange and a liquid drain gap is formed between the piston rod and the flange at the central opening.

8 Claims, 6 Drawing Sheets

WATER RESISTANT QUICK STOP SCALE DAMPER

BACKGROUND OF THE INVENTION

1. Field of the Disclosure

The present disclosure is generally directed to mechanical scales, and more particularly to a water resistant damper and a quick stop mechanical scale used in the food service industry.

2. Description of Related Art

Many mechanical weighing apparatuses, or scales, are known in the art. One problem with mechanical scales occurs when an object to be weighed is placed on the load platform. The weighing mechanism, often incorporating a spring, tends to bounce or oscillate before coming to rest. This causes the indicator needle to also oscillate or bounce and delay in reaching a final measurement position. Some mechanical scales are known to employ a dampening mechanism to attenuate such oscillations and to assist the indicator needle in quickly stopping at its final measurement position.

A food service environment, such as a commercial kitchen, must by law be kept in a highly sanitary condition. One reason is to avoid cross contamination of the various food preparation and other work surfaces. A weighing apparatus used in such a food service environment must therefore be maintained in a sanitary condition. At a minimum, the load or weighing platform of the scales, and often the entire exterior of the scales, must be washed frequently. However, the presence of excessive moisture can negatively impact the accuracy and performance of a mechanical scale.

Some mechanical scales claim varying degrees of water resistance. One problem with current scale designs is that often only portions of the scale, such as a housing or platform, are submersible in water or are dishwasher safe. Thus, such a scale must be partly disassembled in order to wash the water resistant components or specific surfaces must be cleaned on the scale by hand while avoiding getting other parts of the scale wet. In many such cases, a number of the scale parts can not be adequately washed because they are not water resistant.

As noted above, some scales employ a mechanical dampening device or damper to assist in quickly stopping oscillation of the weighing platform. Such mechanical dampening devices are typically not water resistant. A typical dampening device for a mechanical scale has a partly open housing with a restricted air passage open to an air chamber. A piston moves within the damper to alter the air chamber size and a piston shaft moves in concert with the piston. The passage restricts air flow into and out of the chamber. The air flow resistance damps movement of a scale component connected to the piston shaft. If exposed to or submersed in water, the passages and/or chambers can take in water, which can prevent the device from functioning properly. Water contamination of the damper can either eliminate the dampening effect or hinder, or even prevent, movement of the damper shaft and piston. This in turn can inhibit or prevent the scale platform from moving properly. A completely water-tight damper may be devised and/or employed. However, such a device would typically be quite sophisticated and expensive and thus not suited for use on a conventional, relatively lower cost mechanical scale of this type.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

A quick stop damper that is water resistant is disclosed and described herein. The disclosed damper is of a fairly simple construction and may not be a completely water-tight component, and thus is relatively inexpensive to use in a mechanical scale. The disclosed damper allows a user to wash the mechanical scale in a dishwasher without adversely affecting performance of the damper. The disclosed damper inhibits water entry into the interior of the device without requiring more precise water-tight components. Splashes or sprays of water are not able to directly enter the interior of the disclosed damper. The scale may even be submerged in some circumstances without affecting damper performance.

The disclosed damper improves upon the prior art damper described above by adding top cover or overcap and a bottom cover to the damper body. The overcap fits snugly over the primary top cap on an existing damper and the bottom cap fits snugly over the open bottom of an existing damper. The top cover or overcap and bottom cover reconfigure the air openings and passages of the conventional damper to introduce the water resistant functionality.

Figure 1:
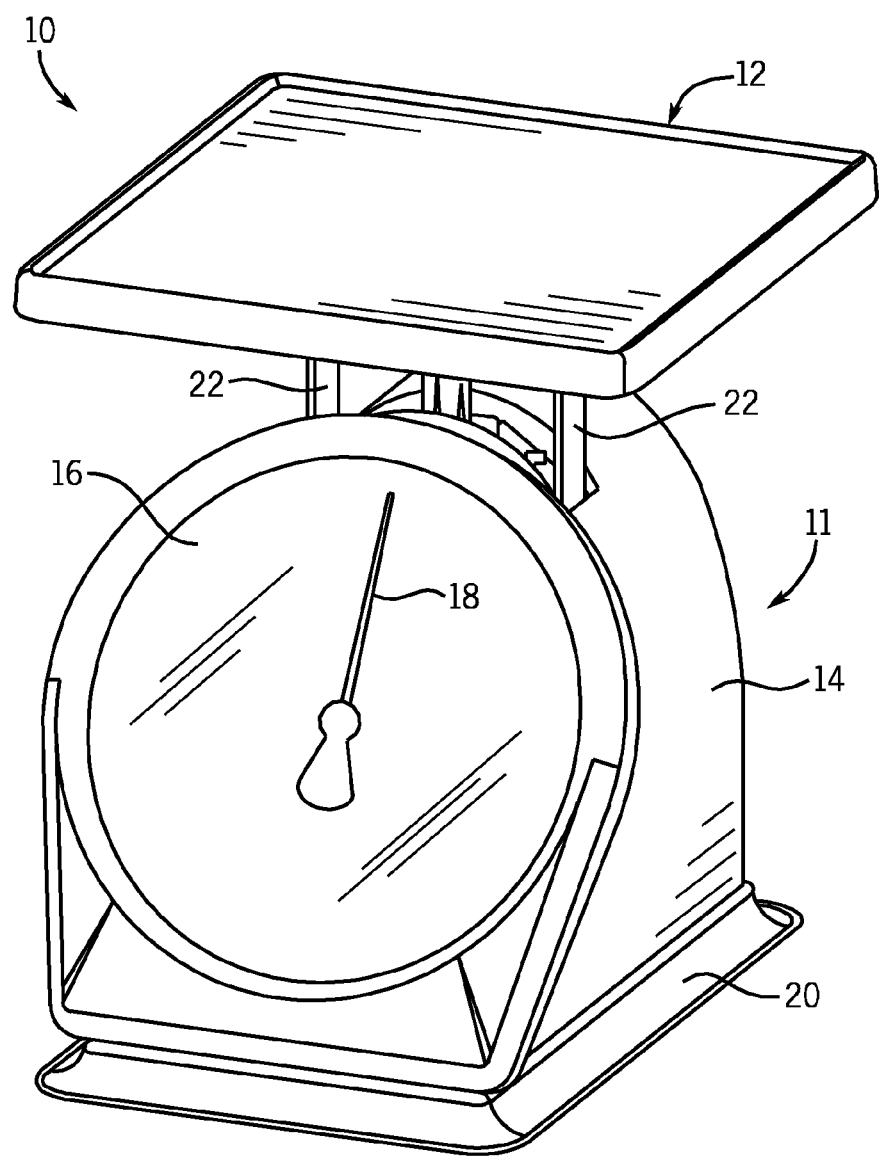
FIG. 1 shows a perspective view of one example of a mechanical scale constructed in accordance with the teachings of the present disclosure.
Figure 2:
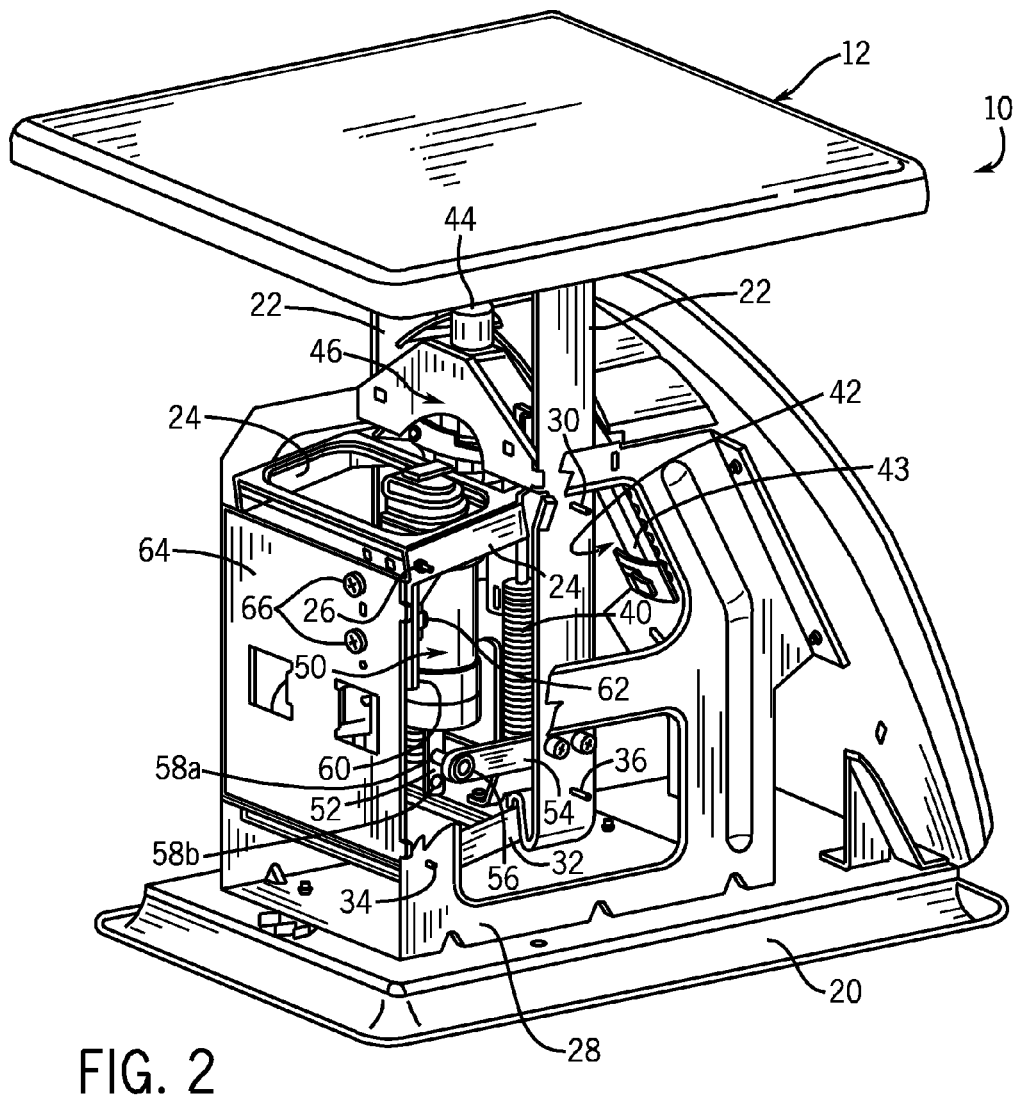
FIG. 2 shows a rear perspective view of the mechanical scale of FIG. 1 with a housing or cover removed, a portion of the frame cut away, and a quick stop damper visible within the scale.

Turning now to the drawings, FIG. 1 illustrates one example of a mechanical scale 10 according to the teachings of the present invention. The scale 10 generally has a body 11 and a load or weighing platform 12 movably supported above a top of the body. The body 11 in this example has a housing or cover 14 that houses a multitude of known internal components for the scale 10. A face or dial 16 on the housing 14 has an indicator needle 18 that is coupled to the internal weighing components. The bottom of the scale body 11 has a base 20 that can be sized and configured to provide a stable resting surface for the scale 10. The housing 14 is disposed below the weighing platform 12 and covers and protects the internal scale components. As is known in the art, one or more items can be placed on the platform to be weighed. The mass of item or items will apply a downward force upon the platform. The scale internal components will resist the downward force, convert the mass to a weight, and move the indicator needle 18 to a position representative of the weight of the article. The internal weighing components can vary considerably in type, form, and construction and yet fall within the spirit and scope of the present invention FIG. 2 shows a view of the scale of FIG. 1 with the housing 14 removed and shows one example of a component arrangement for the internal weighing components and mechanisms. In this example, the platform 12 is a generally flat panel with a top surface S upon which articles to be weighed can be placed. The platform 12 is mounted to and supported on a pair of spaced apart posts 22. The posts 22 are coupled to a box, four-bar linkage or carriage assembly. The carriage assembly has a top carriage with spaced apart horizontal top legs 24. A retained end of each top leg 24 of the top carriage is pivotally connected at a pivot 26 to a respective side of a fixed frame 28 (partly cut away in FIG. 2). A movable end of each top leg 24 is pivotally connected via a pivot 30 to a respective one of the platform posts 22 and can move vertically in concert with movement of the posts. The carriage assembly also has a bottom carriage with spaced apart horizontal bottom legs 32. A retained end of each bottom leg 32 of the bottom carriage is pivotally connected at a pivot 34 to the respective side of the fixed side frame 28. A movable end of each bottom leg 32 is pivotally connected via a pivot 36 to a lower end of the respective post 22.

A pair of calibrated springs 40 is connected at an upper end at a fixed point and at a lower end to one of the posts 22. Thus, each spring 40 is extended against its biasing force as the posts 22 and the platform 12 move downward. A rack and pinion assembly 42 is connected to the needle 18 on the dial 16. The needle 18 is rotationally driven by linear movement of a rack portion 43 of the assembly 42 as the platform 12 and the posts 22 move vertically. A zero out knob or adjustment knob 44 projects up from a gearbox 46 and through the top of the housing 14 beneath the platform 12. The gearbox 46 connects the zero out knob 44 and the platform 12 to the rack 43 of the rack and pinion assembly 42. The zero out knob 44 can be rotated to adjust or reset the needle 18 to zero on the face of the dial 16 before determining the weight of an object, as is known in the art.

As an object is placed on the platform, the object's mass will lower the platform 12 and posts 22, which in turn will drop the pivots 30 and 36 of the carriage assembly. This movement in turn extends the springs 40. Movement of the carriage assembly and posts 22 drives movement of the rack and pinion assembly 42 via the gearbox 46 and rotates the needle 18 accordingly to indicate the weight of the object on the platform.

The above described weighing mechanism and components can vary considerably and yet fall within the spirit and scope of the present invention. The various weighing mechanism components described above are but one of many possible configurations and constructions for a mechanical scale. Other arrangements are certainly within the spirit and scope of the present invention. The invention is not intended to be limited in scope to the particular weighing mechanism and component arrangement used.

As is known in the art, when an object is dropped onto the weighing platform 12, the springs 40 in this type of scale will tend to oscillate until coming to rest. Spring oscillation results in vertical bouncing of the weighing mechanism components, which in turn results in rotational bouncing or oscillation of the needle 18. To counteract such oscillation, a dampening mechanism or damper 50 is mounted within the scale interior and is coupled to the weighing mechanism to quickly stop vertical oscillation of the components. In the disclosed example, the damper 50 generally has a piston rod 52 that extends down and protrudes from the bottom of the damper body. A link arm 54 is fixedly mounted extending horizontally from one of the posts 22. The link arm 54 moves vertically up and down, and thus oscillates, in concert with movement of the platform 12 and the post 22 to which it is attached. In this example, the free end of the link arm 54 is connected via a fastener 56 to the piston rod 52 of the damper 50. The lower end of the piston rod 52 includes a pair of mounting holes 56*a*, 56*b* to provide alternate attachment locations to the link arm 54, if needed to accommodate a given scale application. In general, the damper 50 will apply resistance to vertical movement of the piston rod 52 and, as a result, to the link arm 54, the posts 22, and thus the platform 12.

As shown in FIG. 2, the damper 50 can be mounted in a vertical position aligned with the vertical movement of the posts 22 and platform 12. The damper 50 can alternatively be mounted in other positions and orientations, depending on the particular scale construction. The damper 50 in this example is fixedly mounted to a mounting plate 60 via screws 62. The mounting plate 60 is in turn secured to a stationary, frame back panel 64 on the interior of the scale 10 via screws 66. However, the damper 50 can be mounted in any suitable location and orientation, again depending on the internal construction of the scale 10, and can be mounted within the scale using any suitable fastening arrangement and components. As will be evident to those having ordinary skill in the art, and as mentioned above, the scale platform 12 can be mounted for movement to a number of alternate structures and yet function as intended. The posts 22 and/or weighing mechanism components of the scale 10 can be modified, altered, repositioned, or even eliminated within the spirit and scope of the present invention. The damper piston rod 52 need only be connected to a movable part of the weighing platform 12 in order to damp its movement and perform the desired dampening function.

Figure 3:
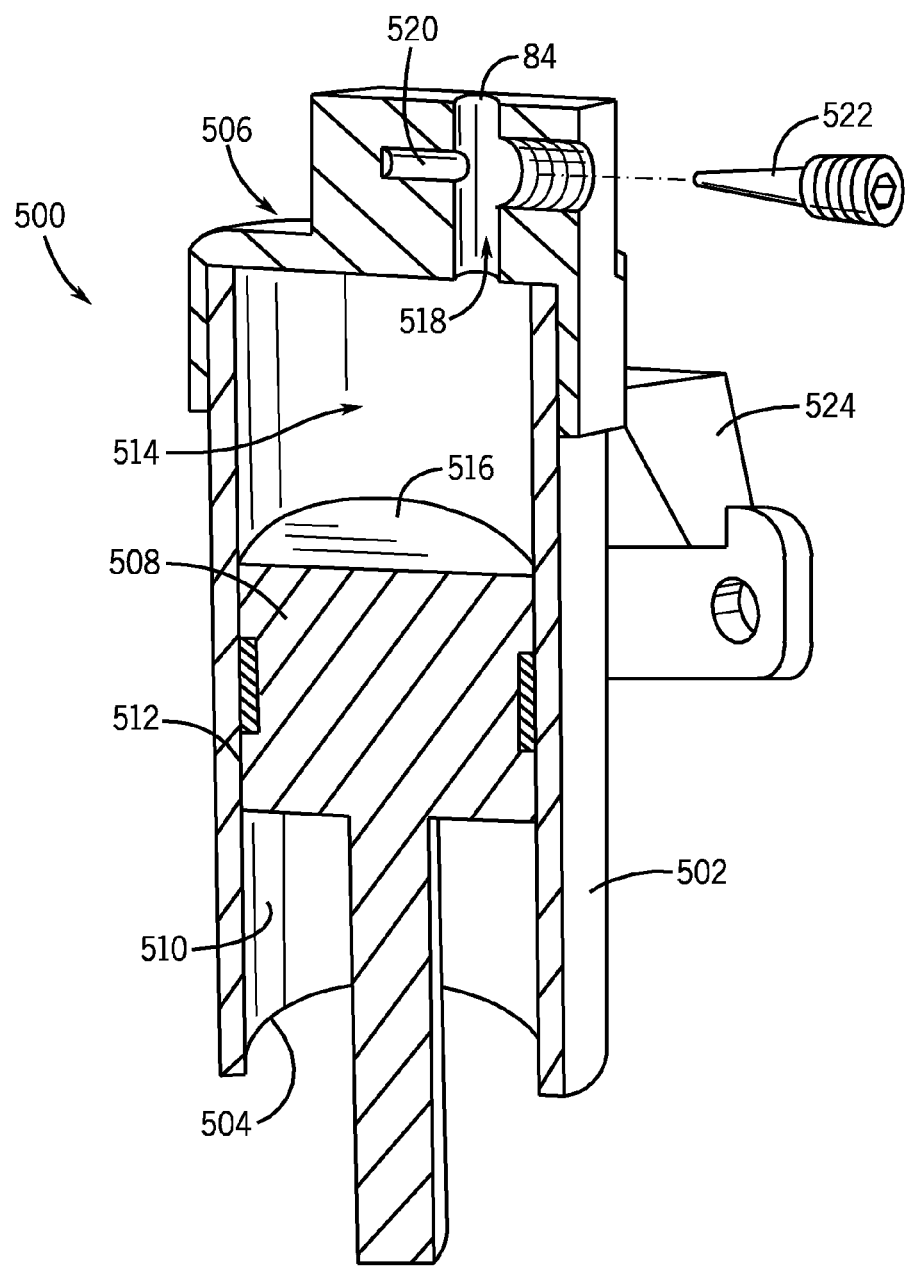
FIG. 3 shows a cross sectional view of a prior art quick stop damper as discussed in the background section.

FIG. 3 shows a cross section of a conventional or known quick stop damper 500 in order to illustrate the differences between the prior art damper and the water resistant damper 50 according to the present disclosure and to illustrate a number of components of the damper 50. The prior art damper 500 generally has a cylinder, tubular body, or sleeve 502. The sleeve 502 in this example has an open bottom 504, a primary top cap 506 over the top of the sleeve, and a piston 508 within the sleeve. The sleeve 502 is a right circular cylinder and is typically formed of glass, but can be formed of other suitable materials. The piston 508 is typically formed of graphite, but also can be formed of any suitable material. The interior surface 510 of the sleeve and the exterior surface 512 of the piston are fitted to a close tolerance. The piston 508 can slide within the sleeve 502 and yet the close tolerance fit creates a substantially sealed air chamber 514 between a top surface 516 of the piston and the primary top cap 506.

The primary cap 506 closes off the open top end of the sleeve 502 and, thus, the chamber 514. The open bottom 504 is open below the piston 508. A piston rod 52 extends down from the bottom of the piston through the open bottom of the sleeve 502. The piston rod 52 can be connected to a movable part of the scale to damp the movement of the platform, as described above and below with the respect to the damper 50 of the invention. The prior art primary top cap 506 has an air passage 518 with a relatively small diameter. The passage restricts air flow to either vent the chamber 514 to atmosphere or to draw air into the chamber. The restricted size of the passage controls piston movement to create the damping affect. The air passage 518 can have a threaded cross-bore 520 configured to receive a threaded adjustment screw or needle valve 522. The needle valve 522 can be turned in or out to adjust the amount or rate of air permitted to exit or enter the chamber 514 during use.

A mounting bracket 524 is coupled to the prior art damper 500 for mounting the damper within a scale. The bracket 524 can be a separate device coupled to the sleeve 502 or top cap 506, or can be integrally formed as part of the primary top cap 506, as in this example. The prior art quick stop damper 500 is open to the air in order to operate properly. Unfortunately, the open air passage 518 and the entirely open bottom 504 can also provide an ingress or path for the damper to take in water. The prior art damper 500 thus is not suited to being washed during a dishwashing cycle. If washed in a dishwasher, for example, a relatively high volume of water could contact the underside of the piston 508 via the open bottom 504. The water could get between the piston exterior surface 512 and the sleeve interior surface 510 and alter the damper performance or prevent movement of the piston 508. Water could also potentially enter the air chamber or the passage 518 and again alter the performance or prevent damper function.

Figure 6:
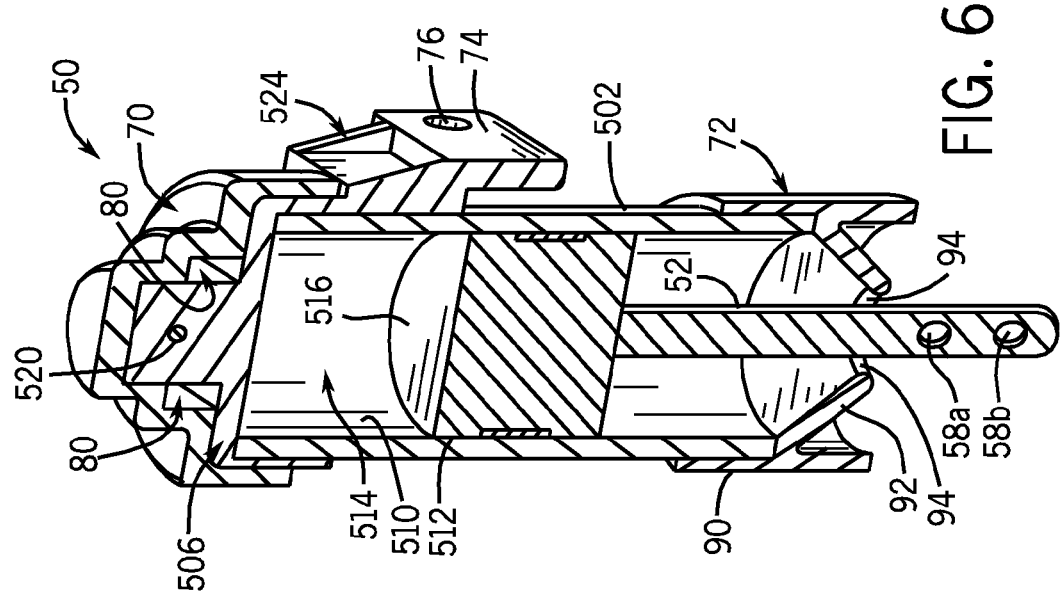
FIG. 6 shows a cross section taken along lines VI-VI of the quick stop damper in FIG. 4.
Figure 4:
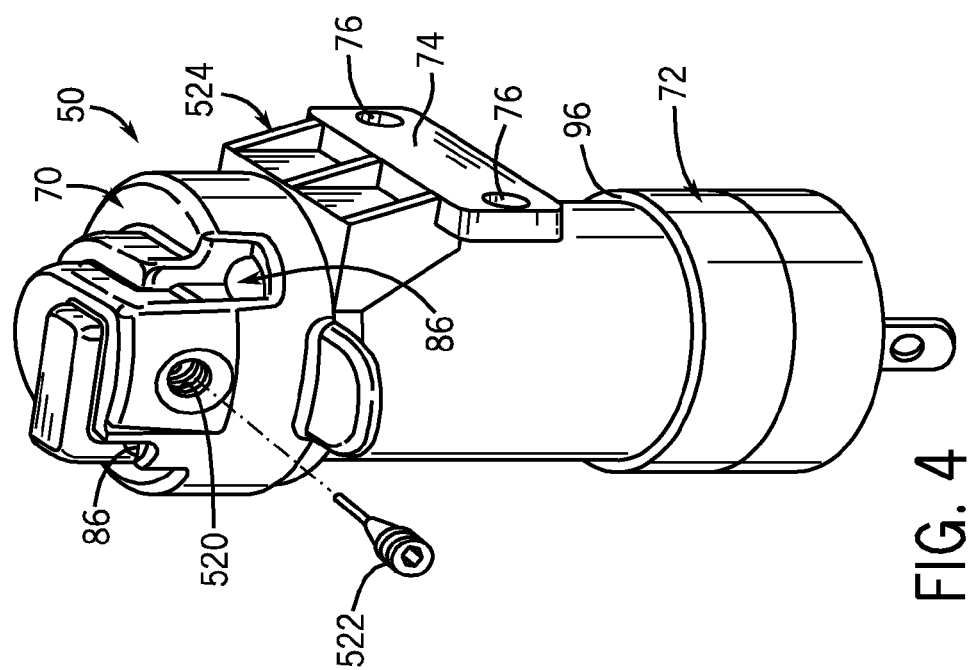
FIG. 4 shows a perspective view of the quick stop damper in FIG. 2 and constructed in accordance with one example of the teachings of the present disclosure.
Figure 5:
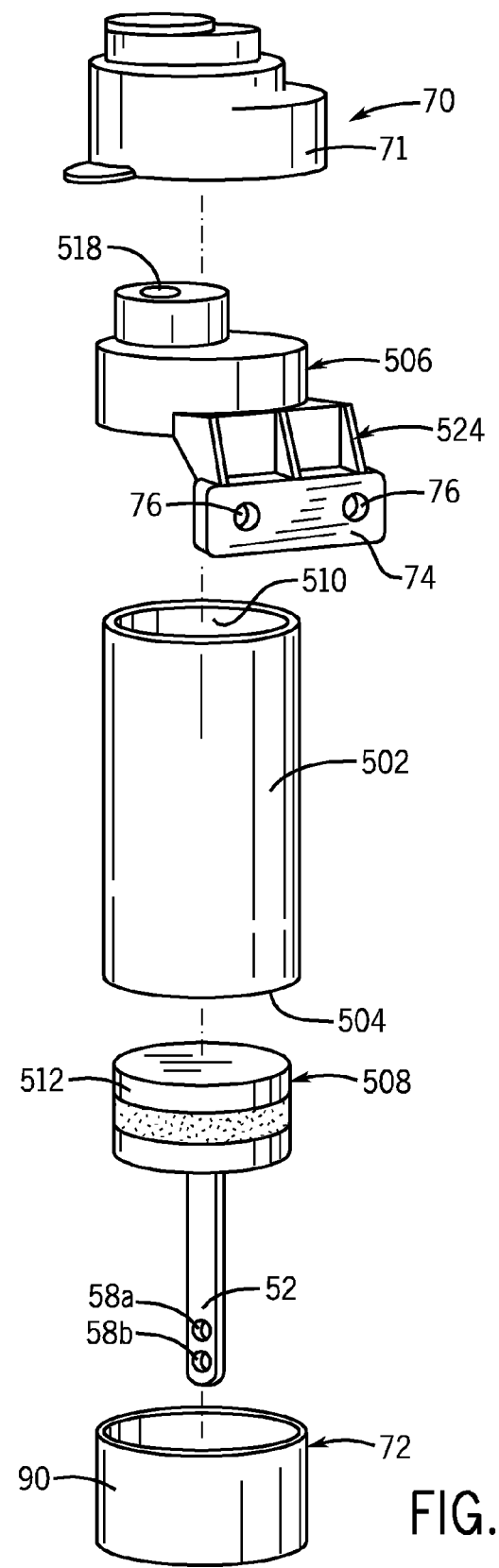
FIG. 5 shows an exploded view of the quick stop damper in FIG. 4.

FIG. 4 shows the water resistant damper 50 in accordance with the teachings of the present invention, and removed from the scale 10. FIG. 5 shows an exploded view and FIG. 6 shows a vertical cross section of the damper 50, which, in the disclosed example, includes all of the components of the damper 500. Thus, the water resistant damper 50 has a sleeve or tube body 502, a primary top cap 506, and a piston 508. However, the damper 50 in this example also has a top cover or overcap 70 fitted over the primary top cap 506 and a bottom cap 72 fitted over the open bottom 504 of the sleeve 502. As shown in FIGS. 2 and 5, the bracket 524 of the top cap 506 has an attachment section 74 and a pair of mounting holes 76 through the section. The above-mentioned fasteners 62 affix the mounting section 74, and thus the damper 50, to the mounting plate 60 within the scale in this example.

When assembled as shown in the cross section of FIG. 6, the top cover or overcap 70 has a skirt 71 that fits snugly over and around the perimeter skirt of primary top cap 506, except leaving exposed the mounting section 74 of the mounting bracket 524. The overcap 70 also has a closed top 68 that covers the top of the cap 506, including the passage 518. The overcap 70 can be molded of a resilient flexible material, a plastic material, or other suitable material as desired. The overcap 70 can also be configured to removably attach or permanently adhere to the top cap 506 as desired. Regardless, the overcap is intended to redirect airflow to and from the passage 518, instead of the passage being directly open to atmosphere.

Figure 7:
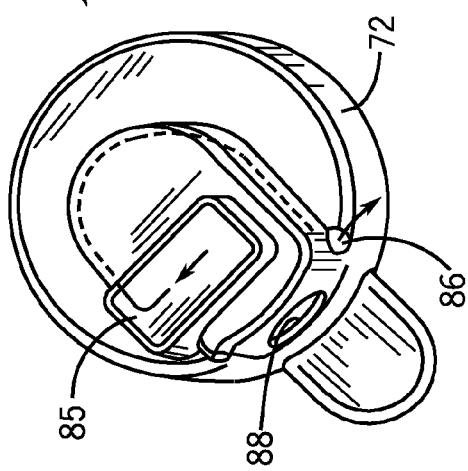
FIG. 7 shows a top perspective view of the top cap of the damper in FIG. 4 and schematically illustrating in phantom a circuitous air flow path through the cap.
Figure 8:
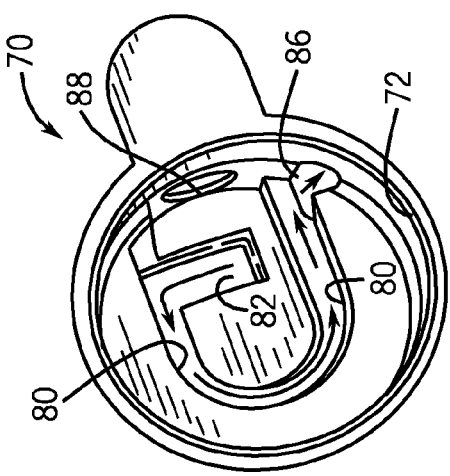
FIG. 8 shows a bottom perspective view of the top cap in FIG. 7, including the air flow path.

In the disclosed example, the overcap 70 is formed having an interior air channel 80, depicted in FIGS. 7 and 8, that is in communication with, and redirects air flow to and from, the air passage 518 of the primary top cap 506. The overcap 70 has a rectangular void space 82 that is positioned over a top opening 84 of the air passage 518. The void space 82 is created beneath an upward projecting section 85 on the top 68 of the overcap 70. The void space 82 is in airflow communication with one end of the air channel 80. The overcap 70 also has a side opening 86 in the skirt 71 that, in this example, is positioned at a lower elevation on the overcap 70 in comparison to the void space 82. The side opening 86 is in airflow communication with the other end of the air channel 80 and is in direct communication with atmosphere. The overcap 70 also has a valve hole 88 in the skirt 71 that aligns with the cross-bore 520 to permit insertion of the needle valve or screw 522.

The air channel 80 is an elongate, curved airflow path that creates a non-linear, multi-elevation air flow path. In this example, the air channel is formed as a groove in the underside of the overcap 70. The groove creates the airway, in combination with the top surface of the top cap 506 when the overcap is placed on the top cap. The air channel 80 significantly lengthens and convolutes the air path between the air chamber 514 and atmosphere on the exterior of the damper 50. The multi-elevation, non-linear nature of the air channel 80 will inhibit or prevent water coming in contact with the overcap 70 from entering the air passage 518, and thus the air chamber 514 in the damper. Even if submerged, air pressure within the chamber 514, passage 518, and air channel 80, in combination with the air channel features, will in all likelihood do the same.

Figure 9:
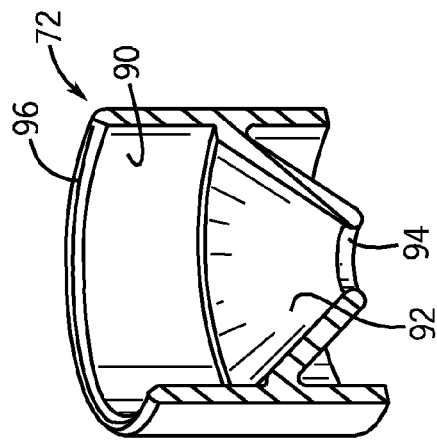
FIG. 9 shows a cross section of the bottom cap taken along lines IX-IX of the exploded damper in FIG. 5.

FIGS. 6 and 9 show cross sections of the bottom cap 72 of the damper 50 in this example. The bottom cap has an annular skirt 90 that is sized to snugly fit over the exterior of the sleeve open end 504. A water shield or annular flange 92 projects radially inward from and circumferentially around the skirt 90 and has a piston rod opening 94 at the center of the flange. In this example, the flange 92 is conical or funnel-shaped and is angled downward in a direction toward the center opening 94. The sleeve 502 is inserted into the top 96 of the skirt 90 on the bottom cap 72 until seating against the flange 92.

As shown in FIG. 6, the piston rod 52 extends through the center opening 94. The size of the center opening 94 and rod 52 are such that a drain gap remains between the conical flange 92 and the piston rod. The flange will inhibit or prevent most any water coming into contact with the underside of the damper 50 from entering the bottom cap. However, the gap at the center opening 94 and the downward angle of the flange 92 will allow and encourage drainage of any minimal amount of water that does manage to enter the bottom cap.

The benefits and advantages of the present disclosure could be achieved with overcaps, air channels, and bottom caps of alternative construction and geometry. The air channel can vary in curvature and length. The difference in height or elevation between the end of the air path, including the air channel and air passage can also vary, as well as how the difference in elevation is achieved on the damper. In one example, the damper 50 could be constructed with a modified primary top cap that integrally incorporates the features and benefits of the circuitous air channel 80, replacing the need for the two separate caps 506 and 70. The components of the disclosed damper 50 can also be formed of alternative materials, such as plastic, rubber, metal, composite, ceramic, glass, graphite, or the like, and remain within the teachings of the present invention. Additionally, alternate processes of manufacture could be used, instead of molding of the overcap, top cap, and bottom cap. Further, the scale itself and the known damper and other components could also be formed of a variety of materials and processes and still remain within the teachings of the present disclosure.

The air openings at the top and bottom of the damper are minimized in the water resistant damper. Also, the water resistant damper has an indirect airflow path to and from the piston air chamber, rather than a direct opening such as on the prior art damper. The features and benefits of the disclosed damper permit the otherwise water resistant mechanical scale to be washed in a dishwasher or even submerged for manual hand washing, if needed, without affecting damper performance. Thus, a scale incorporating the disclosed water resistant damper is well suited for the highly regulated commercial kitchen environment.

Although certain scales and dampening mechanisms have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:
1. A scale comprising:
a housing defining an interior and having an exterior;
a movable post extending from the housing and coupled to
 a weighing mechanism within the housing interior;

a weighing platform carried by the movable post outside of the housing exterior; and a water resistant damper mounted within the housing interior and coupled to the movable post, the damper having a piston within a sleeve, a top cap on a top end of the sleeve, an air chamber between the piston and the top cap within the sleeve, an air passage to the air chamber through the top cap, and a bottom cap fitted over a bottom end of the sleeve, wherein an elongate, non-linear air channel communicates between the air passage and a port formed through a portion of the top cap, wherein the bottom cap has an annular flange extending inward to a central opening in the flange, wherein the flange is funnel shaped and angles away from the open bottom of the sleeve, and wherein the piston rod extends through the central opening in the flange and the central opening creates a water drain gap between the flange and piston rod.

2. A scale according to claim 1, wherein the port is positioned lower than an uppermost opening to the air passage.

3. A scale according to claim 1, wherein the top cap further comprises:

a primary top cap closing off the open top of the sleeve; and
an overcap fitted over a portion of the primary top cap, wherein the air channel is created between surfaces of the primary top cap and the overcap, and wherein the air passage is formed through the primary top cap and the port is formed through the overcap.

4. A scale according to claim 3, wherein the port is positioned at an elevation that is below an elevation of an uppermost opening of the air passage in the primary top cap.

5. A scale according to claim 1, further comprising a needle valve received through the air passage and configured to adjust the size of the air passage.

6. A scale according to claim 5, wherein the air passage extends vertically from the air chamber through the top cap, wherein a blind cross-bore extends part way through the top cap and across the air passage, and wherein the needle valve is adjustably received in the cross-bore and extends into the air passage.

7. A scale according to claim 1, wherein a piston is received in and is axially slidable along an interior passage of the sleeve, the piston having a top surface, an underside, and a piston rod extending from the underside toward the open bottom.

8. A scale according to claim 1, wherein the top cap further comprises:

a primary top cap closing off the open top of the sleeve; and
an overcap fitted over a portion of the primary top cap, wherein the air channel is created between surfaces of the primary top cap and the overcap.

* * * * *